US008089784B2

(12) United States Patent
Choi (10) Patent No.: US 8,089,784 B2
(45) Date of Patent: Jan. 3, 2012

(54) SYNCHRONOUS RECTIFIER (75) Inventor: Hang-Seok Choi, Gunpo (KR)

(73) Assignee: Fairchild Korea Semiconductor, Bucheon (KR)

( * ) Notice: Subject to any disclaimer, the term of this patent is extended or adjusted under 35 U.S.C. 154(b) by 537 days.

(21) Appl. No.: 12/343,967

(22) Filed: Dec. 24, 2008

(65) Prior Publication Data
US 2009/0175056 A1 Jul. 9, 2009

(30) Foreign Application Priority Data

Jan. 4, 2008 (KR) ........................ 10-2008-0001331

(51) Int. Cl.
H02M 3/335 (2006.01)
(52) U.S. Cl. .......................... 363/25; 363/17; 363/21.02
(58) Field of Classification Search .............. 363/16–20, 363/22, 25, 21.02, 97, 98, 127, 132, 21.04, 363/21.06
See application file for complete search history.

(56) References Cited

U.S. PATENT DOCUMENTS

| 4,860,184 | A * | 8/1989 | Tabisz et al. | 363/17 |
| 5,991,167 | A * | 11/1999 | Van Lerberghe | 363/16 |
| 6,344,979 | B1 * | 2/2002 | Huang et al. | 363/16 |
| 6,407,934 | B1 * | 6/2002 | Ishii et al. | 363/21.14 |
| 6,683,797 | B2 * | 1/2004 | Zaitsu et al. | 363/16 |
| 7,184,280 | B2 * | 2/2007 | Sun et al. | 363/21.02 |
| 7,193,866 | B1 * | 3/2007 | Huang et al. | 363/22 |

OTHER PUBLICATIONS

Fairchild Semiconductor FSFR2100 Datasheet, FSFR-Series—Fairchild Power Switch for Half-Bridge Resonant Converters, May 2008, pp. 1-17.
Fairchild Semiconductor Application Note AN-4151, Half-Bridge LLC Resonant Converter Design Using FSFR-series Fairchild Power Switch, 2007, pp. 1-17.
Y. Liang et al. "Design of Integrated Passive Component for a 1MHz 1 kW Halg-bridge LLC Resonant Converter," IAS, 2005, pp. 2223-2228.
B. Yang, "Over Current Protection Methods for LLC Resonant Converter," APEC, 2003, pp. 605-609.
B. Yang, "LLC Resonant Converter for Front End DC/DC Conversion," APEC, 2002, pp. 1108-1112.
B. Lu, "Optimal Design Methodology for LLC Resonant Converter," APEC, 2006, pp. 533-538.

* cited by examiner

*Primary Examiner* — Rajnikant Patel
(74) *Attorney, Agent, or Firm* — Sidley Austin LLP (57) ABSTRACT

This invention relates to a synchronous rectifier for LLC resonant converter. This method allows simple drive method for the synchronous rectifier MOSFETS by using the transformer secondary winding voltage and one-shot vibrator. The synchronous rectifier MOSFETs are turned on by being triggered to the transformer secondary side winding voltage and turned off after predetermined time set by one shot vibrator. The predetermined time is set by the resonant period of the resonant network.

16 Claims, 7 Drawing Sheets

FIG.7

SYNCHRONOUS RECTIFIER

CROSS-REFERENCE TO RELATED APPLICATION

This application claims priority to and the benefit of Korean Patent Application No. 10-2008-0001331 filed in the Korean Intellectual Property Office on Jan. 4, 2008 the entire contents of which are incorporated herein by reference.

BACKGROUND

1. Field of the Invention

The present invention relates to a synchronous rectifier.

2. Description of the Related Art

A synchronous rectifier is generated by substituting a switch for a diode of a secondary coil of a transformer forming an LLC resonant converter. The synchronous rectifier provides an improved efficiency by minimizing a voltage drop across the diode. For the efficiency improvement, it is required to precisely control the on/off time of the switch associated with the secondary coil of the synchronous rectifier.

In general, the synchronous rectifier senses voltages at both terminals of the switch associated with the secondary coil of the transformer, and turns on/off the switch corresponding to the sensed voltage.

A current is induced by the primary coil in the secondary coil of the transformer and flows through a body diode of the switch associated with the secondary coil of the transformer a voltage corresponding to a forward voltage drop of the body diode is sensed across the terminals of the switch associated with the secondary coil. Since the voltage corresponding to the forward voltage drop of the body diode is sensed across the terminals of the switch of the secondary coil, the switch associated with the secondary coil is turned on. When the switch associated with the secondary coil is turned on, the impedance characteristics across the terminals of the switch associated with the secondary coil exhibit a constant resistance. Since the voltage across the terminals of the switch associated with the secondary coil is proportional to the current flowing through the switch, the switch is turned off when the voltage across the terminals of the switch is sensed and the current flowing through the switch is reduced below a reference value. When the switch associated with the secondary coil is turned off, the current flows through the body diode of the switch and a reverse bias is applied to the body diode of the secondary coil switch as the current induced by the primary coil in the secondary coil of the transformer is reduced to zero so that a current through the body diode does not flow any more.

However, the voltage to determine the turn-off time of the secondary coil switch, sensed by the synchronous rectifier driven by the above-noted method is a low voltage (e.g., several tens of mV), it is weak relative to the noise. Further, it is difficult to control the off time of the secondary coil switch because of the influence by a parasitic component on a printed circuit board (PCB) layout. For both of these reasons, it is difficult to improve the efficiency of the above rectifier beyond a degree compared to the general LLC resonant converter.

Another method for driving the synchronous rectifier has been proposed to control the on/off states of the secondary coil switch of the transformer by using a control signal for controlling the on/off states of the primary coil switch of the transformer. When the synchronous rectifier is driven by using this method, the on/off time of the secondary coil switch can be more precisely controlled.

However, in order to implement the method, an additional component such as a photocoupler or a transformer is required so as to transmit a control signal of the primary coil of the transformer to the secondary coil, and hence the production cost of the synchronous rectifier in increased. Also, when the switch associated with the primary coil of the transformer is turned on/off with a frequency that is less than the resonance frequency of the transformer, resonance of the current flowing to the secondary coil of the transformer can be terminated before the switch of the primary coil of the transformer is turned off, and hence, the switch of the secondary coil of the transformer may not be turned off at an appropriate time. Accordingly, the current may flow in the reverse direction to reduce efficiency.

The above information disclosed in this Background section is only for enhancement of understanding of the background of the invention and therefore it may contain information that does not form the prior art that is already known in this country to a person of ordinary skill in the art.

SUMMARY

Briefly and generally, an embodiment of the present invention includes a synchronous rectifier including a square wave generator including a first switch and a second switch, and generating a square wave corresponding to an input voltage by alternately turning on/off the first switch and the second switch; a resonator including a first coil of a primary coil of a transformer, and generating a resonance waveform corresponding to the square wave; and an output unit including a second coil and a third coil of a secondary coil of the transformer, and outputting a first voltage corresponding to currents that are generated in the second coil and the third coil corresponding to the resonance waveform, wherein the output unit includes a third switch coupled between the second coil and a ground; a fourth switch coupled between the third coil and the ground; and a switching controller for turning on/off the third switch and the fourth switch.

The switching controller maintains the third switch at the On state for a first period from a first time in which a second voltage at the third switch is reduced from a first level to a second level that is less than the first level, and it maintains the fourth switch at the On state for a second period from a second time in which a third voltage at the fourth switch is reduced from the first level to the second level.

Another embodiment includes a synchronous rectifier having a square wave generator including a first switch and a second switch, and generating a square wave corresponding to an input voltage by alternately turning on/off the first switch and the second switch; a resonator including a first coil of a primary coil of a transformer, and generating a resonance waveform corresponding to the square wave; and an output unit including a second coil and a third coil of a secondary coil of the transformer, and outputting a first voltage corresponding to currents that are generated in the second coil and the third coil corresponding to the resonance waveform, wherein the output unit includes: a third switch coupled between the second coil and a ground; a fourth switch coupled between the third coil and the ground; and a switching controller for turning on/off the third switch and the fourth switch.

The switching controller maintains the third switch at the On state during a first period from a first time when the current flows through a body diode of the third switch, and it maintains the fourth switch at the On state during a second period from a second time when the current flows through a body diode of the fourth switch.

In some embodiments, the on/off states of the switches SR1 and SR2 can be precisely controlled by sensing the voltage induced to the secondary coil of the transformer without adding components such as a photocoupler or a transformer, and hence, a synchronous rectifier with a low cost, stability, and high efficiency can be realized.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element.

Figure 1:
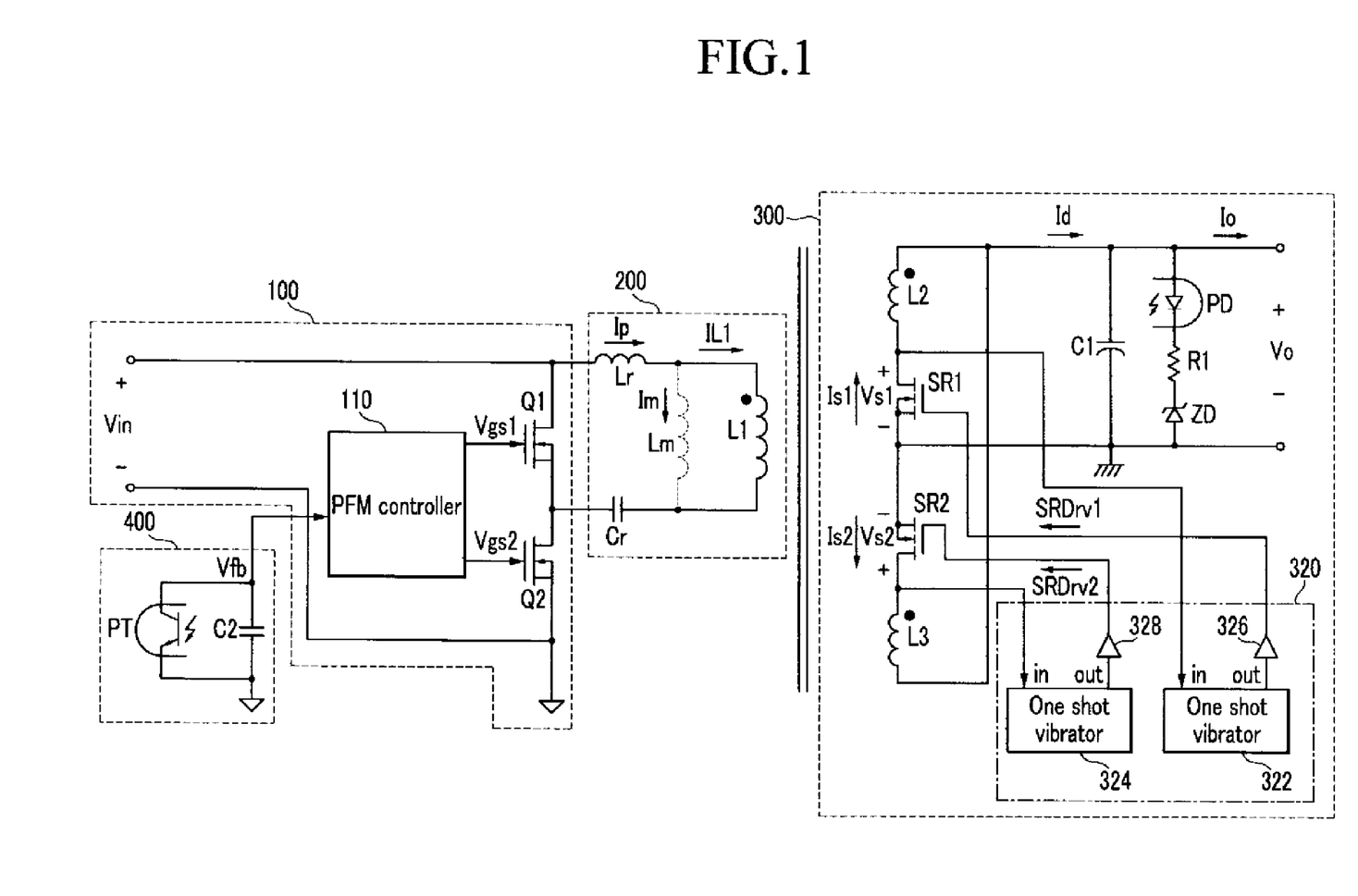
FIG. 1 shows a configuration of a synchronous rectifier according to an exemplary embodiment of the present invention.

FIG. 1 shows an embodiment of a synchronous rectifier. The synchronous rectifier can include a square wave generator 100, a resonator 200, an output unit 300, and a feedback circuit 400.

The square wave generator 100 can include a PFM controller 110 and switches Q1 and Q2, and generate a square wave corresponding to on/off states of the switches Q1 and Q2.

The switch Q1 has a first terminal coupled to a node between a first terminal of an input terminal of an input voltage Vin and an inductor Lr. The switch Q2 has a first terminal coupled to a node between a second terminal of the switch Q1 and a capacitor Cr, and a second terminal coupled to a node between a second terminal of an input terminal of the input voltage Vin and a ground terminal.

The PFM controller 10 can generate a pulse frequency modulation signal corresponding to a feedback signal Vfb input by the feedback circuit 140, and output control signals Vgs1 and Vgs2 for controlling the on/off states of the switches Q1 and Q2.

Here, the PFM controller 110 may alternately turn on/off the two switches Q1 and Q2. Also, the PFM controller 110 may drive the two switches Q1 and Q2 so that their duty cycles may be approximately 50%. In some embodiments, the PFM controller 110 can provide a dead time of several hundreds of nanoseconds (ns) between the control signal Vgs1 turning on the switch Q1 and the control signal Vgs2 turning on the switch Q2 so that the switch Q1 and the switch Q2 may not be turned on simultaneously, and hence it can prevent a penetration current caused by the arm short phenomenon and control the switches Q1 and Q2 to perform a zero voltage switching (ZVC) operation. Here, the dead time can represent a period for maintaining the switch Q1 and the switch Q2 at the turned off state.

The resonator 200 can include inductors Lr and Lm, a primary coil L1 and a capacitor Cr of the transformer, and it can transmit part of the resonance current that is generated by resonating the square wave generated by the square wave generator 100 to the output unit 300. Here, the inductor Lm represents a parasitic inductance that is associated with the primary coil L1 of the transformer. In other words, the inductor Lm represents magnetizing inductance, and it functions as a shunt inductor for providing a current path for controlling the current (Ip−IL1=Im) to flow to the capacitor Cr other than the current IL1 that is induced to the secondary coils L2 and L3 of the transformer through the primary coil L1 of the transformer from among the current Ip flowing to the inductor Lr. That is, the inductor Lm can maintain a voltage gain of the synchronous rectifier even when a load of an output terminal is changed, so as to control the output voltage Vo with an almost constant frequency without relation to a load change.

The inductor Lr can have a first terminal coupled to the first terminal of the switch Q1. The first terminal of the primary coil L1 of the transformer can be coupled to the second terminal of the inductor Lr. The first terminal of the capacitor Cr can be coupled to the second terminal of the primary coil L1 of the transformer, and the second terminal can be coupled to a node between the switch Q1 and the switch Q2. The inductor Lm can be formed at the primary coil L1 of the transformer as the current flows to the primary coil L1 of the transformer. Here, the inductance of the inductor Lm can be greater than the inductance of the inductor Lr. For example, the inductance of the inductor Lm can be three to eight times the inductance of the inductor Lr.

The feedback circuit 400 can include a photo transistor PT for forming a photocoupler together with a photodiode PD of the output unit 300, and a capacitor C2 coupled in parallel with the photo transistor PT. The photo transistor PT can be driven by receiving the current flowing through the photodiode PD of the output unit 300. For example, when the output voltage Vo is increased, the feedback voltage Vfb, charged in the capacitor C2, can be reduced, and when the output voltage Vo is reduced, the feedback voltage Vfb can be increased. The PFM controller 110 may control drive frequencies of the switches Q1 and Q2 according to the feedback voltage Vfb, and control the output voltage Vo to be constant through the pulse frequency modulation.

The output unit 300 can include secondary coils L2 and L3 of a transformer, switches SR1 and SR2, a capacitor C1, a photodiode PD, a resistor R1, a Zener diode ZD, and a switching controller 320, and it may outputs the output voltage Vo corresponding to the current induced to the secondary coils L2 and L3 of the transformer from the resonator 200.

The capacitor C1 may have a first terminal coupled to a first terminal of the secondary coil L2 of the transformer and a second terminal coupled to the ground. An anode of the photodiode PD can be coupled to a first terminal of the capacitor C1. A first terminal of the resistor R1 can be coupled to a cathode of the photodiode PD. The Zener diode ZD can have a cathode coupled to a second terminal of the resistor R1, and an anode coupled to the ground. The switch SR1 can have a first terminal coupled to a second terminal of the secondary coil L2 of the transformer, and a second terminal coupled to ground. The switch SR2 can have a first terminal coupled to the ground, and a second terminal coupled to a first terminal of the secondary coil L3 of the transformer. A second terminal of the secondary coil L3 of the transformer can be coupled to the first terminal of the secondary coil L2 of the transformer. Here, the voltage at the capacitor C1 is the output voltage Vo, and the current flowing to the photodiode PD can vary according to the output voltage Vo. The photodiode PD forms a photocoupler together with the photo transistor PT of the feedback circuit 400 and provides information corresponding to the output voltage Vo to the feedback circuit 400.

The switching controller 320 may include one-shot vibrators 322 and 324 and drivers 326 and 328.

The one shot vibrator 322 can generate an output signal corresponding to a voltage Vs1 applied to the switch SR1. The one shot vibrator 324 can generate an output signal corresponding to a voltage Vs2 applied to the switch SR2. That is, the output signals of the one shot vibrators 322 and 324 can be switched to High when the voltage Vs1 and the voltage Vs2 are switched from High to Low (i.e., a falling edge), the output signals are maintained at High for a predetermined time and are than switched to Low.

The driver 326 can apply a control signal SRDrv1 for turning on/off the switch SR1 corresponding to the output signal of the one shot vibrator 322 to a control electrode of the switch SR1. The driver 328 may apply a control signal SRDrv2 for turning on/off the switch SR2 corresponding to the output signal of the one shot vibrator 324 to a control electrode of the switch SR2. For example, the driver 326 can be realized to output a High control signal SRDrv1 to turn on the switch SR1 when the output signal of the one shot vibrator 322 is High, and to output a Low control signal SRDrv1 to turn off the switch SR1 when the output signal of the one shot vibrator 322 is Low. In a like manner, the driver 328 can be realized to output a High control signal SRDrv2 to turn on the switch SR2 when the output signal of the one shot vibrator 324 is High, and to output a Low control signal SRDrv2 to turn off the switch SR2 when the output signal of the one shot vibrator 224 is Low.

For reference, not shown in FIG. 1, the switches Q1, Q2, SR1, and SR2 respectively can include a body diode for controlling the current to flow from the source to the drain according to the characteristic of the metal oxide semiconductor field-effect transistor, or MOSFETs. While the switches Q1, Q2, SR1, and SR2 are illustrated as MOSFETs in FIG. 1, other types of switches are used in other embodiments.

An operation of a synchronous rectifier with reference to FIG. 1 will now be described. To start with, the current induced by the primary coil L1 of the transformer in the secondary coils L2 and L3 of the transformer can be proportional to the respective turn ratios of the primary coil L1 and the secondary coils L2 and L3.

On/off drive frequencies fs of the switch Q1 and Q2 of the square wave generator 100 can vary according to the input voltage Vin that is input through a load of an output terminal of the synchronous rectifier or an input terminal. However, the resonance frequency fo of the resonator 200 may have a constant value because it follows the characteristics of components included in the resonator 200.

First, an operation of a synchronous rectifier when the switches Q1 and Q2 of the square wave generator 100 are turned on/off with a frequency fs that is less than the resonance frequency fo of the resonator 200 will now be described with reference to FIG. 2 to FIG. 6. A load coupled to the output terminal of the synchronous rectifier is shown as a load resistor Ro.

Figure 2:
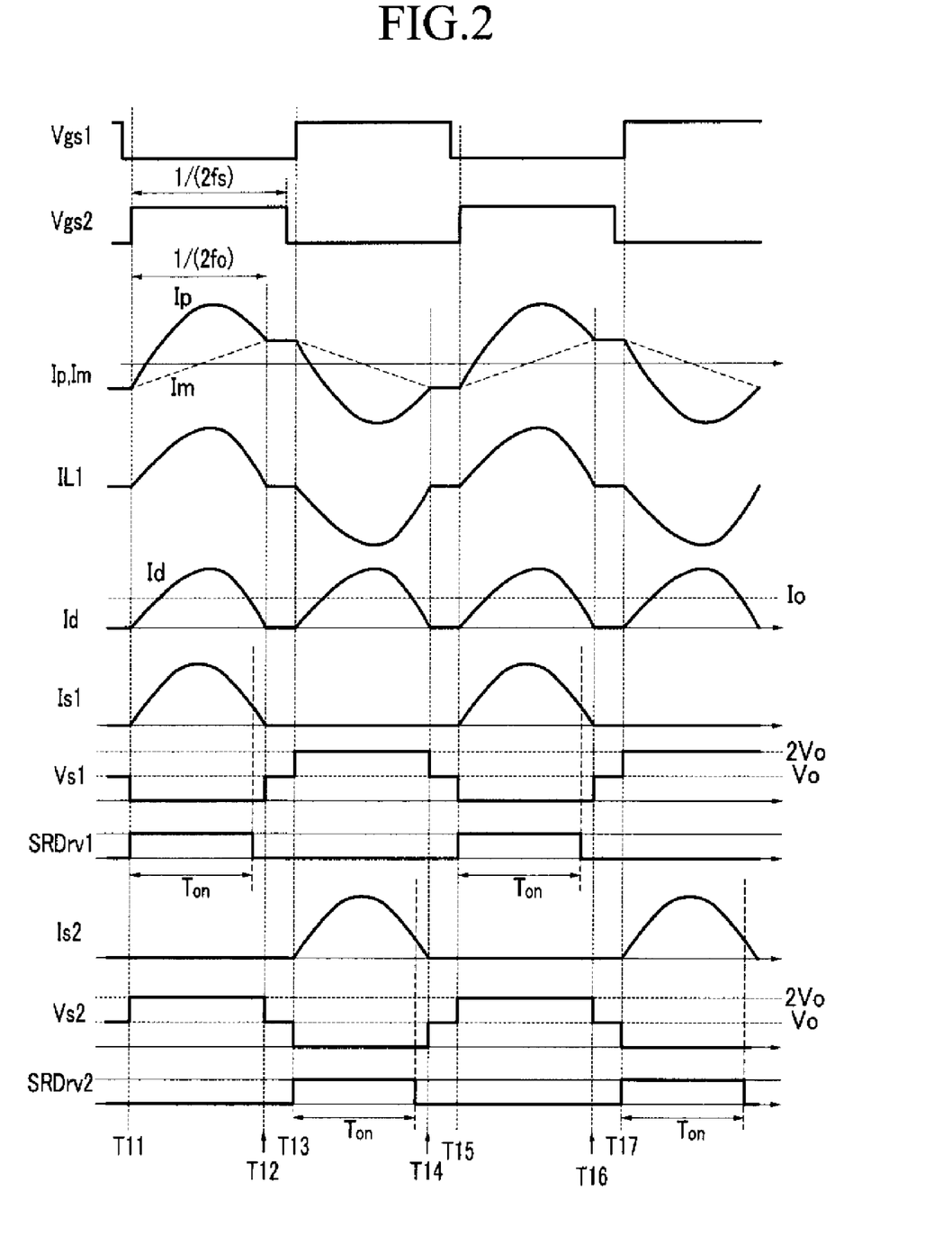
FIG. 2 shows a waveform diagram of showing voltage and current waveforms of respective parts of a synchronous rectifier when switches Q1 and Q2 of a square wave generator 100 of a synchronous rectifier according to an exemplary embodiment of the present invention is driven to be turned on/off with a frequency (fs) that is less than a resonance frequency (fo) of a resonator 200.

FIG. 2 shows voltage and current waveforms of respective parts of a synchronous rectifier when switches Q1 and Q2 of a square wave generator 100 of a synchronous rectifier are driven to be turned on/off with a frequency fs that is less than a resonance frequency fo of a resonator 200.

A waveform from the time T11 to the time T13 in the waveform diagram shown in FIG. 2 will now be described with reference to FIG. 3 and FIG. 4.

Figure 3:
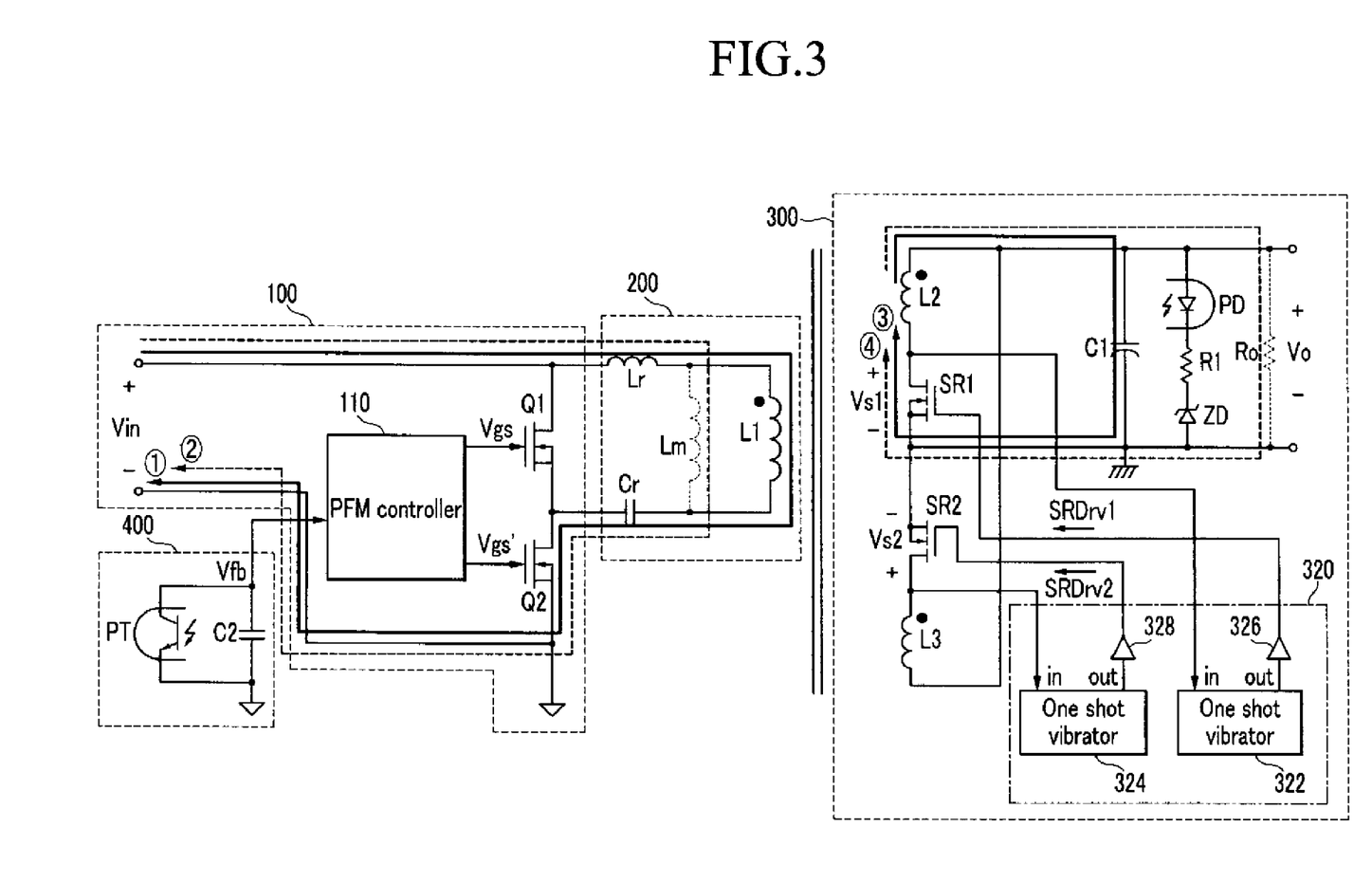
FIG. 3 shows first to third current paths (①-③) flowing to a synchronous rectifier from the time T11 to the time T12 in a waveform diagram shown in FIG. 2.

FIG. 3 shows first to third current paths ①-③ flowing in a synchronous rectifier from the time T11 to the time T12 according to a waveform shown in FIG. 2. FIG. 4 shows second and fourth current paths ②, ⑤, flowing in a synchronous rectifier from the time T12 to the time T13 according to a waveform shown in FIG. 2.

First, at the time T11, the switch Q2 can be turned on. When the switch Q2 is turned on, the current may flow from the first terminal of the input terminal of the input voltage Vin to the second terminal of the input terminal of the input voltage Vin through the first current path ① via the inductor Lr, the primary coil L1 of the transformer, the capacitor Cr, and the switch Q2. In parallel, current also flows from the first terminal of the input terminal of the input voltage Vin to the second terminal of the input terminal of the input voltage Vin through the second current path ② via the inductor Lr, the inductor Lm, the capacitor Cr, and the switch Q2. Here, the current flowing through the second current path ② is circulated in the primary coil of the transformer, and the current flowing through the first current path ① supplies a load current to the secondary coil of the transformer.

In FIG. 2, the first current path ① is shown with a solid line and the second current path ② is shown with the dotted line. The current flowing through the first current path ①, that is, the current IL1 flowing to the primary coil L1 of the transformer corresponds to the difference between the current Ip flowing to the inductor Lr and the current Im flowing through the second current path ② and it is shown in FIG. 2.

As the current flows through the first current path ①, a current is induced in the secondary coil L2 of the transformer, and hence, the current flows from the first terminal of the secondary coil L2 of the transformer to the second terminal of the secondary coil L2 of the transformer through the third current path ③ via the capacitor C1 and the switch S1. In parallel, the current also flows from the first terminal of the secondary coil L2 of the transformer to the second terminal of the secondary coil L2 of the transformer through a fourth current path ④ via the load resistor Ro and the switch S1.

Since the output unit 300 of the synchronous rectifier outputs a constant voltage Vo, the capacitor C1 can be charged with the output voltage Vo before the time T11. Since no current flows through the secondary coils L2 and L3 of the transformer before the time T11, the voltages at the secondary coils L2 and L3 of the transformer are 0V, and the voltage Vs1 corresponds to the output voltage Vo.

As the current flows through the third and fourth current paths ③, ④, the body diode of the switch SR1 can be turned on. Accordingly, the voltage Vs1 can be reduced to approximately 0V. Also, the voltage Vs2 across the switch SR2 can be increased from the voltage Vo to the voltage 2Vo.

The one shot vibrator 322 may output an output signal for transitioning from Low to High synchronously with a falling edge of the voltage Vs1 and maintaining High for a predetermined time Ton. The driver 326 can turn on the switch SR1 by receiving a High signal from the one shot vibrator 322.

When the switch SR1 is turned on, the current flowing through the body diode of the switch SR1 may flow through the drain from the source of the switch SR1. If the switch SR1 is shown as an equivalent circuit, it can be shown as resistance for dropping a lesser voltage compared to the body diode, and hence, the voltage drop caused by the switch SR1 can be less compared to the case in which the current flows through the body diode.

When the output signal of the one shot vibrator 322 transitioned to High after a predetermined time Ton, the output signal of the one shot vibrator 322 can be transitioned to Low. Accordingly, the switch SR1 can be turned off so that the current flowing from the source of the switch SR1 through the drain flows through the body diode of the switch SR1.

The resonance frequency fo of the resonator 200 can have a constant value, and in FIG. 2, resonance generated by the resonator 200 may start from the time T11 and finish at the time T12. The period Ton during which the output signal of the one shot vibrator 322 maintains High is set to be finished before the T12. That is, the switch SR1 is set to be turned off about the time when resonance by the resonator 200 is terminated, and hence, the period during which the current flows through the body diode of the switch SR1 can be very short, and the voltage drop caused by the switch SR1 can be minimized.

The time T12 represents the time when the resonance between the inductor Lr and the capacitor Cr of the resonator 200 is terminated.

When the resonance between the inductor Lr and the capacitor Cr of the resonator 200 is terminated at the time T12, the current of the primary coil of the transformer flows through the second current path ②. Accordingly, no current is induced by the primary coil L1 of the transformer in the secondary coil L2 of the transformer, and thus no current flows through the third and fourth current paths ③, ④. Accordingly, since the current flowing through the secondary coils L2 and L3 of the transformer becomes 0 A, the voltages across the secondary coils L2 and L3 of the transformer become 0V, and hence, the voltage Vs1 is increased to the voltage Vo, and the voltage Vs2 is reduced from the voltage 2Vo to the voltage Vo.

Figure 4:
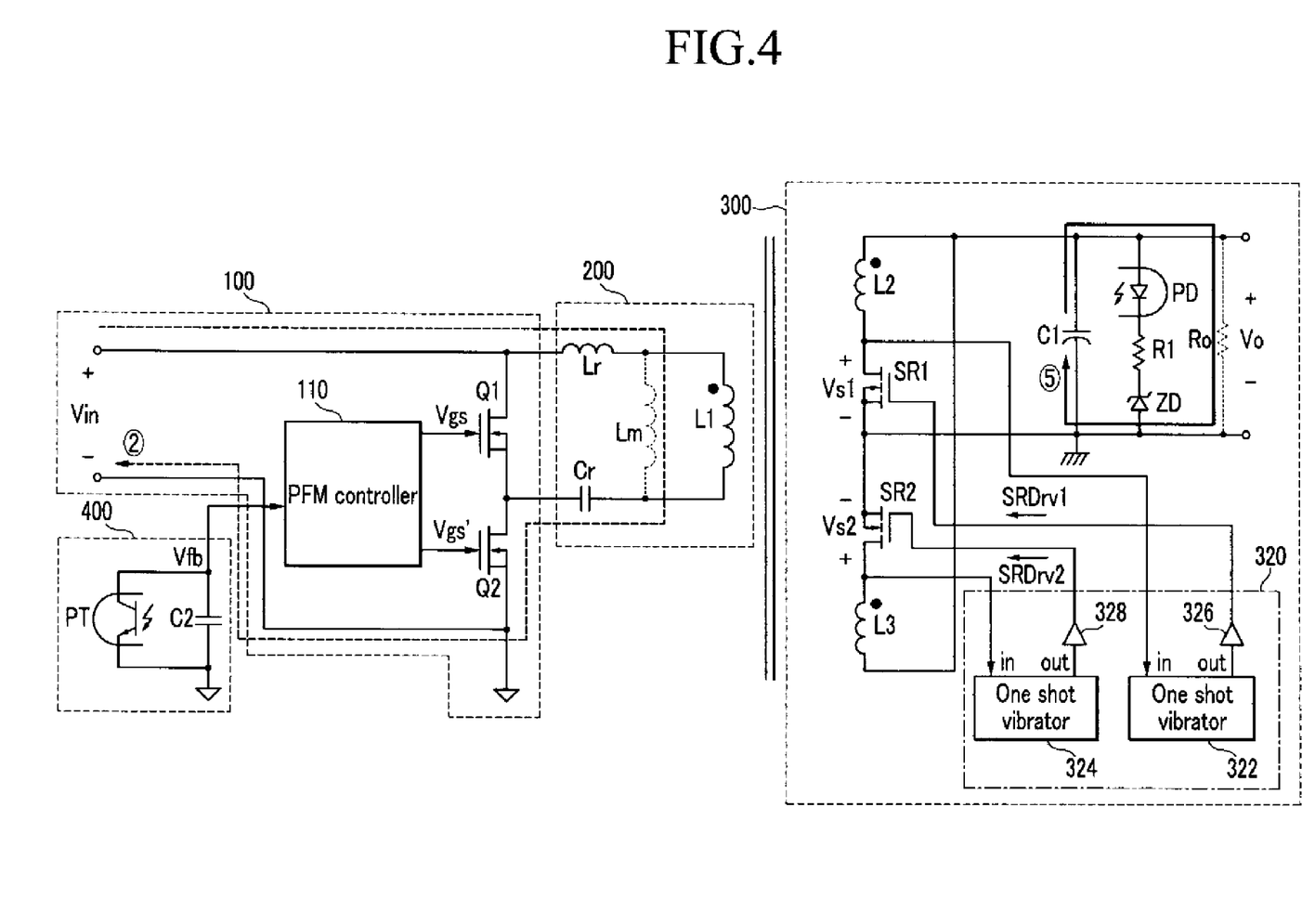
FIG. 4 shows second and fourth current paths (②, ⑤) flowing to a synchronous rectifier from the time T12 to the time T13 in a waveform diagram shown in FIG. 2.

FIG. 4 shows that at this time the current can freewheel by the voltage Vo charged in the capacitor C1 through a fifth current path ⑤ via the first terminal of the capacitor C1, the load resistor Ro, and the second terminal of the capacitor C1.

Waveforms in FIG. 2 from the time T13 to the time T15 will now be described with reference to FIG. 5 and FIG. 6.

Figure 5:
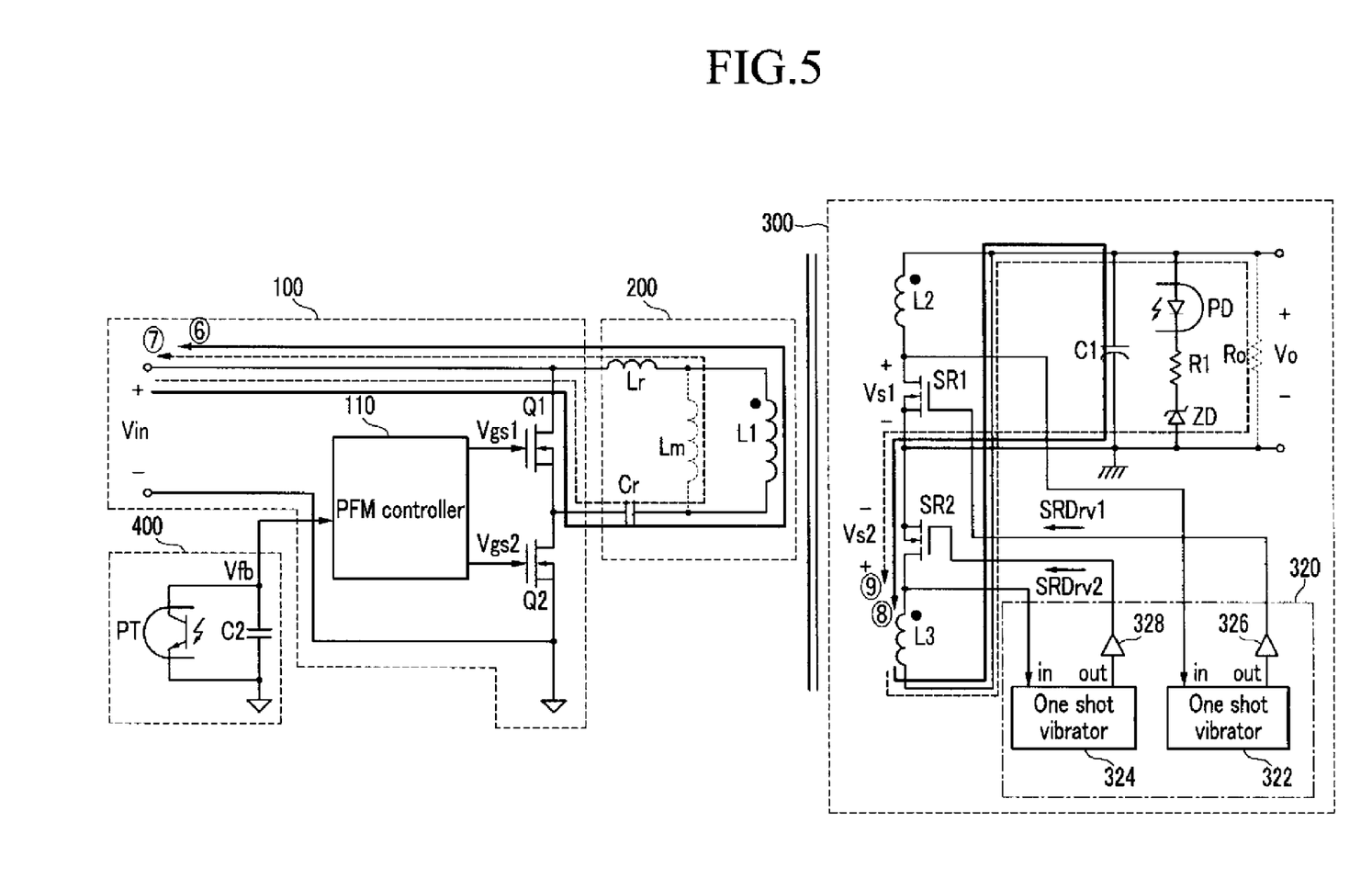
FIG. 5 shows sixth to ninth current paths (⑥-⑨) flowing to a synchronous rectifier from the time T13 to the time T14 in a waveform diagram shown in FIG. 2.
Figure 6:
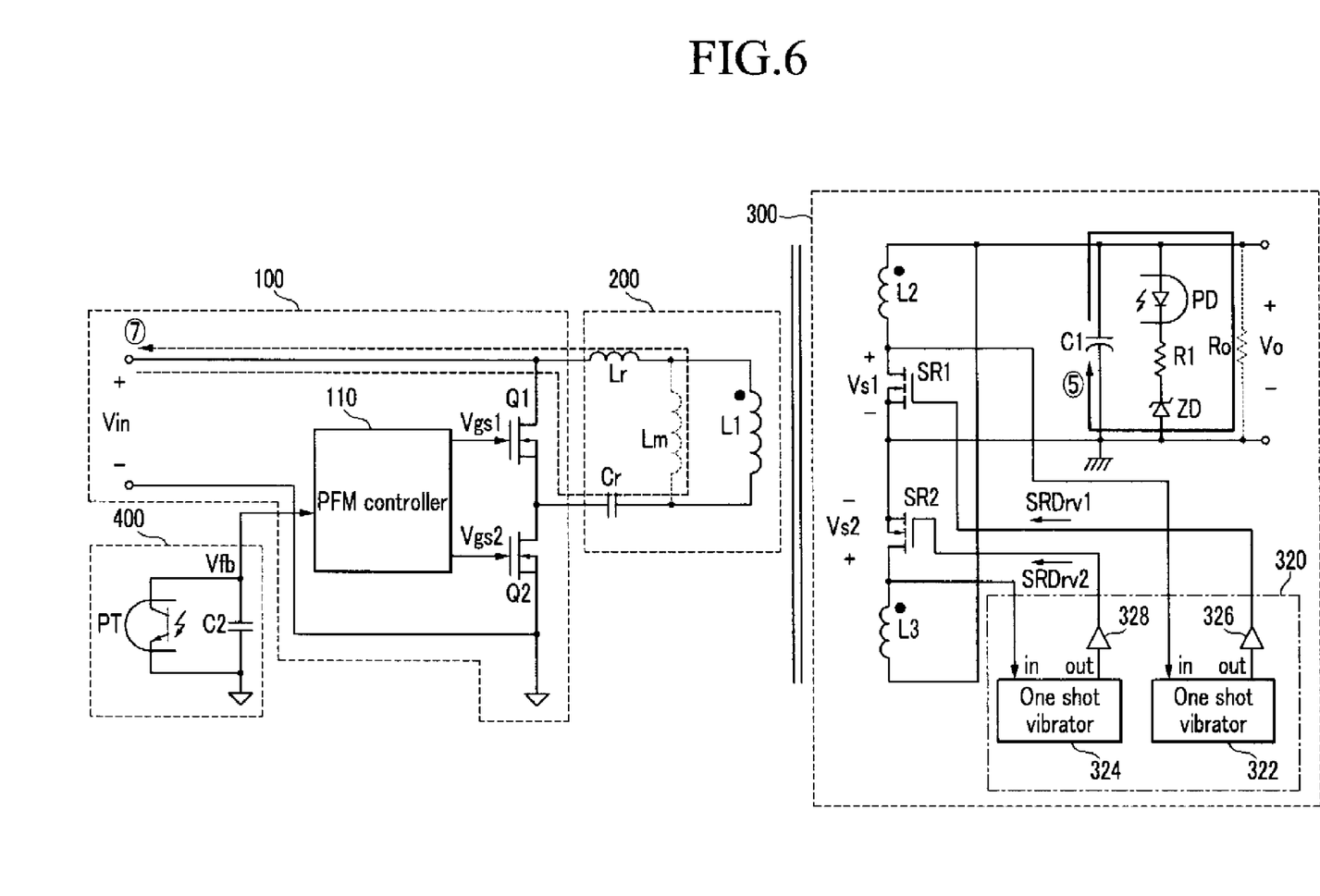
FIG. 6 shows fifth and seventh current paths (⑤, ⑦) flowing to a synchronous rectifier from the time T14 to the time T15 in a waveform diagram shown in FIG. 2.

FIG. 5 shows sixth to ninth current paths ⑥-⑨ flowing through the synchronous rectifier from the time T13 to the time T14. FIG. 6 shows fifth and seventh current paths ⑤, ⑦ flowing through the synchronous rectifier from the time T14 to the time T15.

The time T13 can represent the time when the switch Q1 is turned on. As the switch Q1 is turned on, the current can flow from the first terminal of the input terminal of the input voltage Vin to the first terminal of the input terminal of the input voltage Vin through the sixth current path ⑥ via the switch Q1, the capacitor Cr, the primary coil L1 of the transformer, and the inductor Lr. At this time the current can flow through the seventh current path ⑦ via the first terminal of the input terminal of the input voltage Vin, the switch Q1, the capacitor Cr, the inductor Lm, the inductor Lr, and the first terminal of the input terminal of the input voltage Vin. Here, the current flowing through the seventh current path ⑦ is circulated in the primary side of the transformer, and the current flowing through the sixth current path ⑥ supplies a load current to the secondary coil of the transformer.

In FIG. 5 the sixth current path ⑥ is shown with a solid line and the seventh current path ⑦ is shown with a dotted line. In this case, the current flowing through the sixth current path ⑥, that is, the current IL1 flowing to the primary coil L1 of the transformer corresponds to the difference between the current Ip flowing to the inductor Lr and the current Im flowing through the seventh current path ⑦, and it is shown in FIG. 2.

As the current flows through the sixth current path ⑥, the current is induced in the secondary coil L3 of the transformer, and the current flows from the first terminal of the secondary coil L3 of the transformer to the second terminal of the secondary coil L3 of the transformer through the eighth current path ⑧ via the capacitor C1 and the body diode of the switch SR2. In this case, the current flows through the ninth current path ⑨ via the first terminal of the secondary coil L3 of the transformer, the photodiode PD, the resistor R1, the Zener diode ZD, the body diode of the switch SR2, and the second terminal of the secondary coil L3 of the transformer.

At the time T13, as the current flows through the eighth and ninth current paths ⑧, ⑨, the body diode of the switch SR2 is turned on, and the voltage Vs2 at the switch SR2 maintains 0V. Also, the voltage Vs1 across the switch SR1 can be increased from the voltage Vo to the voltage 2Vo.

The one shot vibrator 324 may output an output signal for transitioning from Low to High synchronously with a falling edge of the voltage Vs2 and maintaining High for a predetermined time Ton. The driver 328 can turn on the switch S2 by receiving a High signal from the one shot vibrator 324.

When the switch S2 is turned on, the current flowing through the body diode of the switch S2 flows from the source of the switch S2 through the drain. If the switch S2 is represented with an equivalent circuit, it can be shown with a resistance for dropping a lesser voltage compared to the body diode, and hence, the voltage drop caused by the switch S2 becomes smaller compared to the case in which the current flows through the body diode.

The output signal of the one shot vibrator 324 can transition to High. After a predetermined time Ton passes, the output signal of the one shot vibrator 324 can transition to Low and the switch S2 is turned off. When the switch S2 is turned off, the current flowing from the source of the switch S2 through the drain flows through the body diode of the switch S2 so that the current flows through the eighth and ninth current paths ⑧, ⑨.

The resonance frequency fo of the resonator 200 can have a constant value, and in FIG. 2, a resonance generated by the resonator 200 is shown to start at the time T13 and terminate at the time T14. In this case, the period Ton during which the output signal of the one shot vibrator 322 maintains High can be set to be terminated before the time T14. That is, the switch S2 is set to be turned off at about the time when the resonance by the resonator 200 is terminated, and hence the period in which the current through the body diode of the switch S2 can be realized to be very short, and the voltage drop caused by the switch S2 can be minimized.

The time T14 represents the time when resonance between the inductors Lr and Lm and the capacitor Cr of the resonator 200 is finished.

When resonance between the inductors Lr and Lm and the capacitor Cr of the resonator 200 is finished at the time T14, the current of the primary coil of the transformer flows through the seventh current path ⑦. Accordingly, the current is induced by the primary coil L1 of the transformer in the secondary coil L3 of the transformer, and no current flows through the eighth and ninth current paths ⑧, ⑨. As a result, since the current flowing through the secondary coils L2 and L3 of the transformer is 0 A, the voltages at the secondary coils L2 and L3 of the transformer become 0V so that the voltage Vs2 is increased to the voltage Vo, and the voltage Vs1 is reduced from the voltage 2Vo to the voltage Vo.

In this case, the current is freewheeled through the fifth current path ⑤ via the first terminal of the capacitor C1, the photodiode PD, the resistor R1, the Zener diode ZD, and second terminal of the capacitor C1 by the voltage Vo charged in the capacitor C1.

An operation of the synchronous rectifier after the time T15 corresponds to an operation after the time T11, and hence, it will not be described.

Up to now the operation of the synchronous rectifier when the switches Q1 and Q2 of the square wave generator 100 are turned on/off with the frequency fs that is less than the resonance frequency fo of the resonator 200 has been described.

Hereinafter, an operation of the synchronous rectifier when the switches Q1 and Q2 of the square wave generator 100 are turned on/off with the frequency fs that is greater than the resonance frequency fo of the resonator 200 will now be described with reference to FIG. 7.

Figure 7:
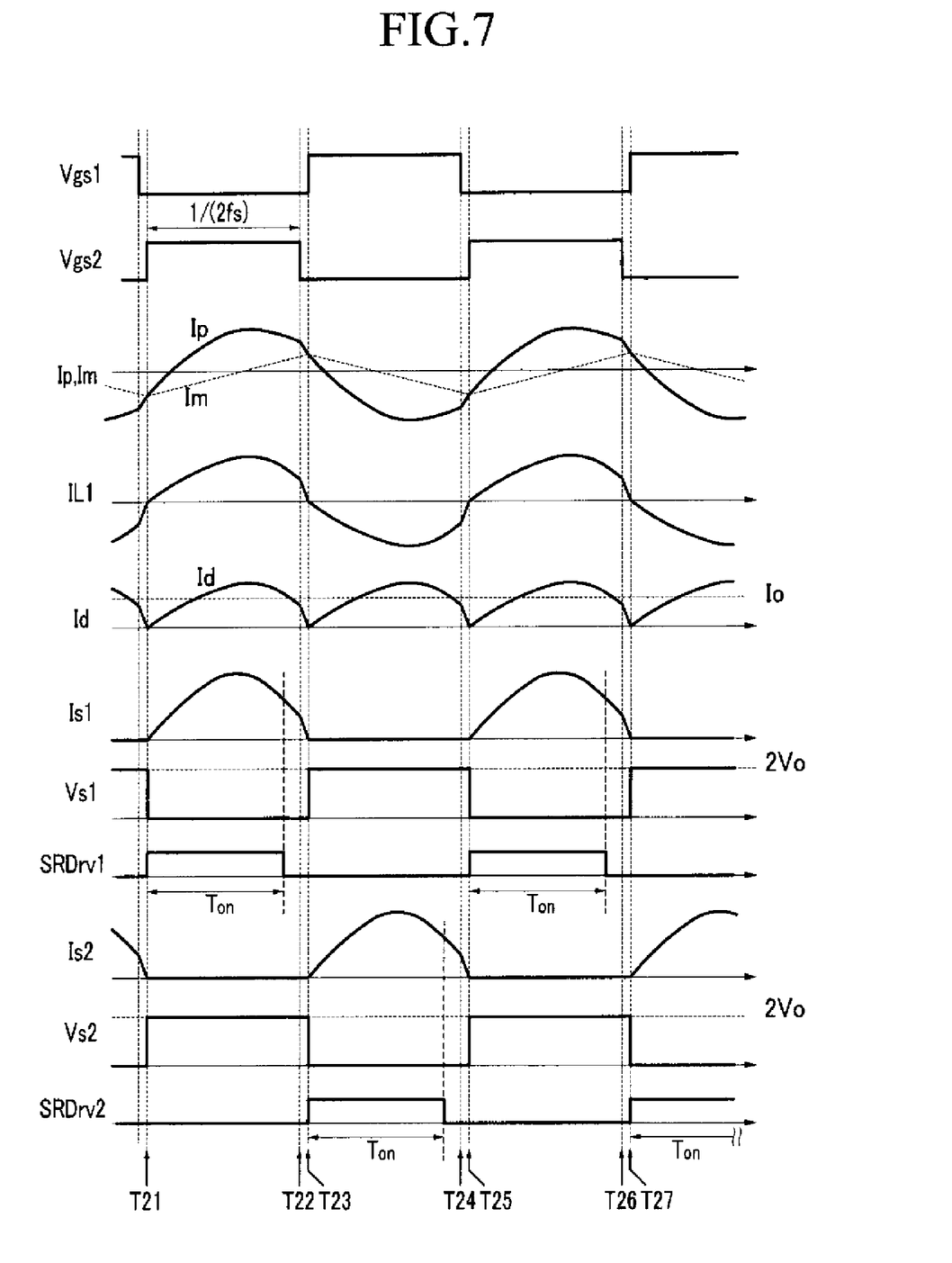
FIG. 7 shows a waveform diagram of voltage and current waveforms for respective parts of a synchronous rectifier according to an exemplary embodiment of the present invention when switches Q1 and Q2 of a square wave generator 100 of the synchronous rectifier is driven to be turned on/off with a frequency (fs) that is greater than a resonance frequency (fo) of a resonator 200.

FIG. 7 shows voltage and current waveforms for respective portions of a synchronous rectifier in some embodiments when switches Q1 and Q2 of a square wave generator 100 of the synchronous rectifier are driven to be turned on/off with a frequency fs that is greater than a resonance frequency fo of a resonator 200.

FIG. 7 shows the case in which the time when an output signal of the one shot vibrator 322 transitioned to Low corresponds to the time when levels of the control signals Vgs1 and Vgs2 transitioned when the switches Q1 and Q2 are turned on/off with a frequency fs that is greater than the resonance frequency fo of the resonator 200.

The time T21 represents the time when the control signal Vgs2 transitioned from Low to High and the switch Q2 is accordingly turned on.

As the switch Q2 is turned on, the current flows through the first and second current paths ①, ② shown in FIG. 3. In this case, the current flowing to the first current path ①, that is, the current IL1 flowing to the primary coil L1 of the transformer corresponds to the difference between the current Ip flowing to the inductor Lr and the current Im flowing to the second current path ②, which is shown in FIG. 7.

The current corresponding to the current flowing through the first current path ① is induced in the secondary coil L2 of the transformer, and hence, the current flows through the body diode of the switch SR1 and the current flows through the third and fourth current paths ③, ④. As the current flows through the third and fourth current paths ③, ④, the body diode of the switch SR1 is turned on and the voltage Vs1 is steeply reduced to 0V. Also, the Vs2 voltage at the switch SR2 can be increased to 2Vo.

The one shot vibrator 322 can output an output signal for transitioning from Low to High synchronously with a falling edge of the voltage Vs1 and for maintaining High for a predetermined time Ton. The driver 326 can turn on the switch SR1 by receiving a High signal from the one shot vibrator 322.

When the switch SR1 is turned on, the current flowing through the body diode of the switch SR1 can flow from the source of the switch SR1 through the drain. If the switch SR1 is represented as an equivalent circuit, it can be expressed as resistance having a lesser voltage compared to the body diode, and hence, the voltage drop caused by the switch SR1 can become less compared to the case in which the current flows through the body diode.

The output signal of the one shot vibrator 322 transitions to High, stays High for a predetermined time Ton and then transitions to Low. Accordingly, the switch SR1 is turned off and the current flowing from the source of the switch SR1 through the drain flows through the body diode of the switch SR1.

The period Ton in which the output signal of the one shot vibrator 322 is High is typically shorter than the period in which the control signals Vgs1 and Vgs2 are High. Accordingly, the period Ton is less than half of the on/off drive period of the switches Q1 and Q2: Ton=0.5/fo. Since the resonance frequency of the switches Q1 and Q2 varies with the input voltage Vin or the load of the output terminal, the period Ton varies accordingly.

The time T22 represents the time at which the control signal Vgs2 transitions from High to Low and the switch Q2 is turned off.

The switch Q2 is turned off at the time T22 before the resonance between the inductor Lr and the capacitor Cr that started when the switch Q2 was turned on at the time T21, is terminated.

The above represents the turn on/off operation of the switches Q1 and Q2 of the synchronous rectifier with the frequency fs that is greater than the resonance frequency fo of the resonator 200.

When the switch Q2 is turned off, the current flowing through the primary coil of the transformer can be substantially reduced, and hence, as shown in FIG. 7, the waveform of the current Ip flowing to the inductor Lr at the time T22 can change in a non-linear manner.

Since the current Ip flowing to the inductor Lr is steeply reduced, the current flowing through the first current path ① can be steeply reduced, and hence, the current induced in the secondary coil L2 of the transformer can also be steeply reduced.

The time T23 represents the time when the control signal Vgs1 transitioned from Low to High and the switch Q1 is turned on.

When the switch Q1 is turned on, the current flowing from the primary coil of the transformer through the first and second current paths ①, ② flows through the sixth and seventh current paths ⑥, ⑦ shown in FIG. 5. In this case, the current flowing through the sixth current path ⑥, that is, the current IL1 flowing through the primary coil L1 of the transformer corresponds to the difference between the current Ip flowing to the inductor Lr and the current Im flowing through the seventh current path (⑦), which is shown in FIG. 7.

Since the current flows through the sixth current path ⑥, the current is induced in the secondary coil L3 of the transformer, and hence, the current flows through the eighth and ninth current paths ⑧, ⑨ shown in FIG. 5 and the body diode of the switch SR2 is turned on.

When the body diode of the switch SR2 is turned on, the voltage Vs2 is steeply reduced to 0V, and the Vs1 voltage at the switch SR1 is increased to be the voltage 2Vo.

The one shot vibrator 324 can output an output signal for transitioning from Low to High synchronously with a falling edge of the voltage Vs2 and maintaining High for a predetermined time Ton. The driver 328 can turn on the switch SR2 by receiving a High signal from the one shot vibrator 324.

When the switch SR2 is turned on, the current flowing through the body diode of the switch SR2 flows from the source of the switch SR2 through the drain. If the switch SR2 in this case is represented as an equivalent circuit, it can be expressed as resistance for dropping a lesser voltage compared to the body diode, and hence, the voltage drop caused by the switch SR2 compared to the case in which the current flows through the body diode can become smaller.

The output signal of the one shot vibrator 324 transitions to High, stays High for a predetermined time Ton and then transitions to Low. Accordingly, the switch SR2 is turned off and the current flowing from the source of the switch SR2 through the drain flows through the body diode of the switch SR2.

The time T24 represents the time when the control signal Vgs1 transitioned from High to Low and the switch Q1 is turned off.

The switch Q1 is turned off at the time T24 before the resonance between the inductor Lr and the capacitor Cr that started when the switch Q1 is turned on at the time T23, which turns on/off the switches Q1 and Q2 of the synchronous rectifier with the frequency fs that is greater than the resonance frequency fo of the resonator 200.

When the switch Q1 is turned off, the current flowing to the primary coil of the transformer is steeply reduced, and hence, as shown in FIG. 7, the waveform of the current Ip flowing to the inductor Lr at the time T24 can change in a non-linear manner.

Since the current Ip flowing to the inductor Lr is steeply reduced, the current flowing through the sixth current path ⑥ is steeply reduced, and hence, the current induced to the secondary coil L3 of the transformer is steeply reduced.

An operation of the synchronous rectifier after the time T25 corresponds to the above-described operation after the time T21 and hence it will not be described.

The synchronous rectifier can sense the voltage induced to the secondary coil of the transformer, and precisely control the on/off states of the switches SR1 and SR2, thereby improving efficiency. Also, the production cost of the synchronous rectifier may be smaller since there is no need to add a photo coupler or a transformer.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A synchronous rectifier comprising:
   a square wave generator including a first switch and a second switch, generating a square wave corresponding to an input voltage by alternately turning on/off the first switch and the second switch;
   a resonator including a first coil of a primary coil of a transformer, generating a resonance waveform corresponding to the square wave; and
   an output unit including a second coil and a third coil of a secondary coil of the transformer, outputting a first voltage corresponding to currents that are generated in the second coil and the third coil corresponding to the resonance waveform, wherein the output unit includes:
   a third switch coupled between the second coil and a ground;
   a fourth switch coupled between the third coil and the ground; and
   a switching controller turning on/off the third switch and the fourth switch, wherein the switching controller maintains the third switch in an On state for a first period from a first time in which a second voltage at the third switch is reduced from a first level to a second level that is less than the first level, and maintains the fourth switch in the On state for a second period from a second time in which a third voltage at the fourth switch is reduced from the first level to the second level.

2. The synchronous rectifier of claim 1, wherein
the first period is shorter than the period in which the first switch maintains the On state, and the second period is shorter than the period in which the second switch maintains the On state.

3. The synchronous rectifier of claim 2, wherein
the first period and the second period do not overlap with each other.

4. The synchronous rectifier of claim 3, wherein
a length of the first period corresponds to a length of the second period.

5. The synchronous rectifier of claim 1, wherein the switching controller comprises:
   a first one shot vibrator, outputting a first signal transitioning from Low to High in synchronization with the first time and maintaining a High for the first period; and
   a second one shot vibrator, outputting a second signal transitioning from Low to High in synchronization with the second time and maintaining at High for the second period.

6. The synchronous rectifier of claim 5, wherein the switching controller further comprises:
   a first driver, generating a first control signal for controlling on/off states of the third switch corresponding to a level of the first signal, and applying the first control signal to a control electrode of the third switch; and
   a second driver, generating a second control signal for controlling on/off states of the fourth switch corresponding to a level of the second signal, and applying the second control signal to a control electrode of the fourth switch.

7. The synchronous rectifier of claim 1, wherein
the first switch and the second switch are coupled in series between input terminals for receiving the input voltage, and
the square wave generator further includes a pulse frequency modulation controller generating a pulse frequency modulation signal corresponding to the first voltage, and turning on/off the first switch and the second switch with a frequency corresponding to the generated pulse frequency modulation signal.

8. The synchronous rectifier of claim 7, wherein the resonator further comprises:
   an inductor having a first terminal coupled to a first terminal of the first switch and a second terminal coupled to a first terminal of the first coil; and
   a capacitor having a first terminal coupled to a second terminal of the first coil and a second terminal coupled to a node of the first switch and the second switch, and
   the resonance waveform is generated through the inductor and the capacitor.

9. A synchronous rectifier comprising:
a square wave generator including a first switch and a second switch, generating a square wave corresponding to an input voltage by alternately turning on/off the first switch and the second switch;
a resonator including a first coil of a primary coil of a transformer, generating a resonance waveform corresponding to the square wave; and
an output unit including a second coil and a third coil of a secondary coil of the transformer, outputting a first voltage corresponding to currents that are generated in the second coil and the third coil corresponding to the resonance waveform, wherein the output unit includes:
a third switch coupled between the second coil and a ground;
a fourth switch coupled between the third coil and the ground; and
a switching controller turning on/off the third switch and the fourth switch, and
the switching controller maintains the third switch in an On state during a first period from a first time when the current begins to flow through a body diode of the third switch, and it maintains the fourth switch in the On state during a second period from a second time when the current begins to flow through a body diode of the fourth switch.

10. The synchronous rectifier of claim 9, wherein
the first period is shorter than the period in which the first switch maintains the On state, and the second period is shorter than the period in which the second switch maintains the On state.

11. The synchronous rectifier of claim 10, wherein
the first period and the second period do not overlap with each other.

12. The synchronous rectifier of claim 11, wherein
a length of the first period corresponds to a length of the second period.

13. The synchronous rectifier of claim 9, wherein the switching controller comprises:
a first one shot vibrator outputting a first signal transitioning from Low to High in synchronization with the first time and maintaining High for the first period; and
a second one shot vibrator outputting a second signal transitioning from Low to High in synchronization with the second time and maintaining High for the second period.

14. The synchronous rectifier of claim 13, wherein the switching controller further comprises:
a first driver generating a first control signal for controlling or/off states of the third switch corresponding to a level of the first signal, and applying the first control signal to a control electrode of the third switch; and
a second driver generating a second control signal for controlling on/off states of the fourth switch corresponding to a level of the second signal, and applying the second control signal to a control electrode of the fourth switch.

15. The synchronous rectifier of claim 9, wherein
the first switch and the second switch are coupled in series between input terminals for receiving the input voltage, and the resonator further includes:
an inductor having a first terminal coupled to a first terminal of the first switch and a second terminal coupled to a first terminal of the first coil; and
a capacitor having a first terminal coupled to a second terminal of the first coil and a second terminal coupled to a node of the first switch and the second switch, and
the resonance waveform is generated through the inductor and the capacitor.

16. The synchronous rectifier of claim 9, wherein the square wave generator further comprises a pulse frequency modulation controller generating a pulse frequency modulation signal corresponding to the first voltage, and turning on/off the first switch and the second switch with a frequency corresponding to the generated pulse frequency modulation signal.

* * * * *